United States Patent
Nagata

(10) Patent No.: US 9,841,888 B2
(45) Date of Patent: Dec. 12, 2017

(54) ELECTRONIC DEVICE AND DISPLAY CONTROL METHOD

(71) Applicant: KYOCERA CORPORATION, Kyoto (JP)

(72) Inventor: Shunsuke Nagata, Higashiosaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/757,734

(22) Filed: Dec. 23, 2015

(65) Prior Publication Data

US 2016/0124597 A1    May 5, 2016

Related U.S. Application Data

(63) Continuation of application No. PCT/JP2014/067081, filed on Jun. 26, 2014.

(30) Foreign Application Priority Data

Jun. 26, 2013 (JP) .................. 2013-134318

(51) Int. Cl.
G06F 3/0485 (2013.01)
G06F 3/0488 (2013.01)
G06F 3/041 (2006.01)

(52) U.S. Cl.
CPC .......... *G06F 3/0485* (2013.01); *G06F 3/0412* (2013.01); *G06F 3/0488* (2013.01)

(58) Field of Classification Search
None
See application file for complete search history.

(56) References Cited

U.S. PATENT DOCUMENTS 9,354,803 B2 * 5/2016 Ording .................. G06F 3/0481
2002/0109709 A1 8/2002 Sagar
(Continued)

FOREIGN PATENT DOCUMENTS

EP 1717684 A2 11/2006
JP 2004-519033 A 6/2004
(Continued)

OTHER PUBLICATIONS

International Search Report in International Application No. PCT/JP2014/067081, dated Aug. 5, 2014, in 5 pages.
(Continued)

*Primary Examiner* — Kenneth B Lee, Jr.
(74) *Attorney, Agent, or Firm* — Duane Morris LLP

(57) ABSTRACT

An electronic device includes: a display unit that includes a display area; a storage unit; a display control unit that displays plurality of information; an operation unit that receives a scroll operation; and a determination unit that determines whether the scroll operation is a high-speed scroll operation of which a speed is higher than a predetermined speed and determines a stop position based on a scroll start position and a scroll operation speed, wherein when it is determined that the scroll operation is not the high-speed scroll operation, the display control unit displays the plurality of information to correspond to the stop position determined, and when it is determined that the scroll operation is the high-speed scroll operation, the display control unit displays the plurality of information to correspond to a corrected stop position, to which the stop position determined by the determination unit is corrected.

6 Claims, 10 Drawing Sheets

(56) References Cited

U.S. PATENT DOCUMENTS

| | | |
|---|---|---|
| 2005/0195222 A1 | 9/2005 | Sugahara |
| 2010/0283753 A1 | 11/2010 | Ohshita |
| 2011/0090255 A1 | 4/2011 | Wilson et al. |
| 2013/0139100 A1 | 5/2013 | Horiike |
| 2014/0142792 A1 | 5/2014 | Hanaka et al. |

FOREIGN PATENT DOCUMENTS

| | | |
|---|---|---|
| JP | 2005-251008 A | 9/2005 |
| JP | 2010-503121 | 1/2010 |
| JP | 2010-055417 A | 3/2010 |
| JP | 2010-262525 A | 11/2010 |
| JP | 2013-025369 A | 2/2013 |
| JP | 2013-25639 | 2/2013 |
| JP | 2013-508812 | 3/2013 |
| JP | 2013-077239 A | 4/2013 |
| JP | 2013-114338 A | 6/2013 |
| JP | 2013-114559 A | 6/2013 |

OTHER PUBLICATIONS

Official Action in Japanese Patent Application No. 2013-134318 dated Jan. 24, 2017, and Concise Explanation (Statement of Relevance of Non-English References) in 4 pages.

Official Action dated Jul. 4, 2017 in corresponding Japanese Patent Application No. 2013-134318 with Statement of Relevance of Non-English References.

* cited by examiner

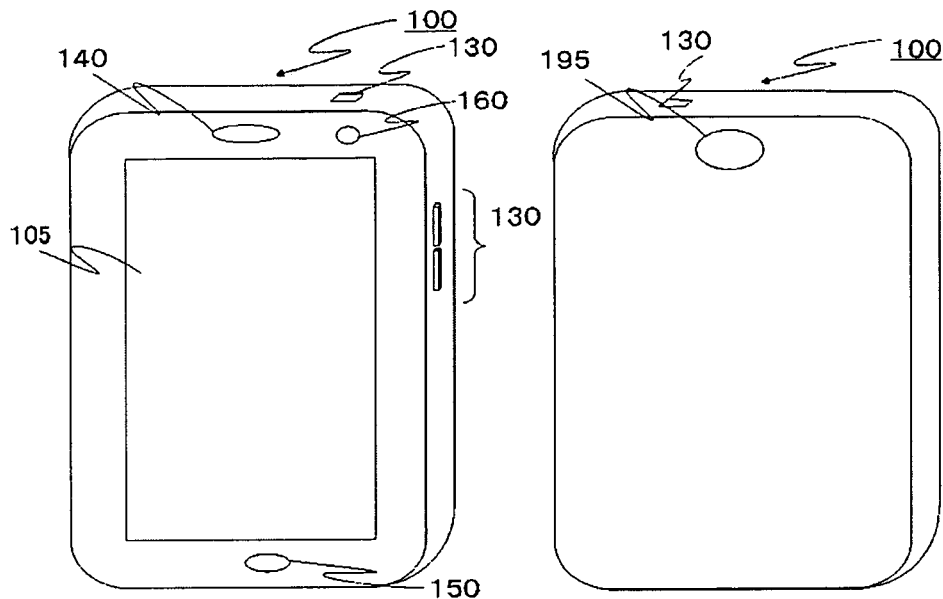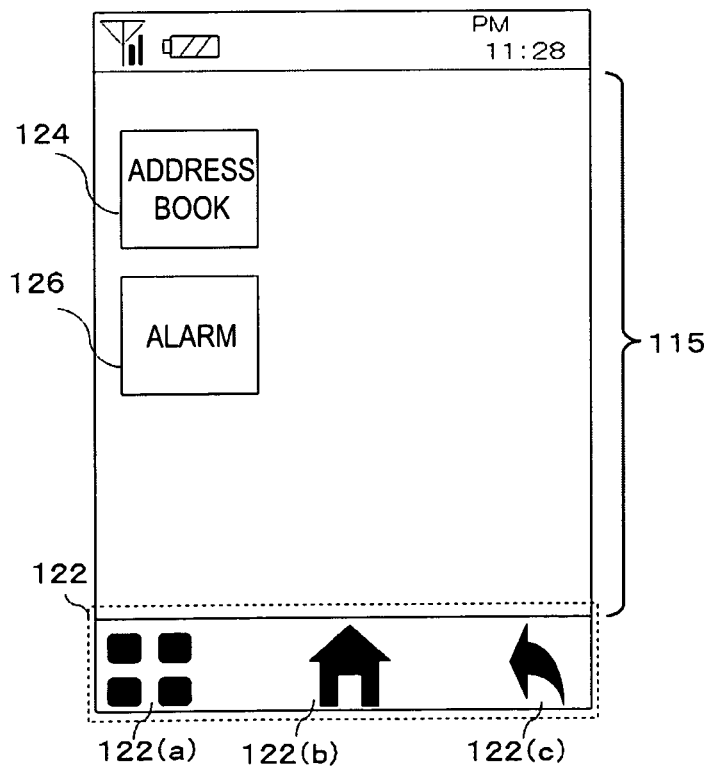

ELECTRONIC DEVICE AND DISPLAY CONTROL METHOD

CROSS-REFERENCE TO RELATED APPLICATION

This application is a continuation of International Application No. PCT/JP2014/067081, filed on Jun. 26, 2014, which claims priority to Japanese Patent Application No. 2013-134318 filed Jun. 26, 2013, the disclosures of which are incorporated herein by reference in their entireties.

TECHNICAL FIELD

The present disclosure relates to an electronic device such as a mobile phone, a personal digital assistant (PDA), a tablet personal computer (tablet PC), an electronic book terminal, and a portable game machine and a display control method which is performed in the electronic device.

BACKGROUND

There is a technique, in which when a scroll operation is received by a touch panel in an information processing device as a terminal device having the touch panel mounted thereon, information displayed on a display is scrolled and desired information is displayed on the display.

SUMMARY

An electronic device of an embodiment includes: a display unit that includes a display area; a storage unit that stores a plurality of information; a display control unit that displays the plurality of information in the display area; an operation unit that receives a scroll operation; and a determination unit that determines whether the scroll operation received by the operation unit is a high-speed scroll operation of which a speed is higher than a predetermined speed and determines a stop position based on a scroll start position and a scroll operation speed, wherein when it is determined that the scroll operation is not the high-speed scroll operation, the display control unit displays the plurality of information to correspond to the stop position determined by the determination unit, and wherein when it is determined that the scroll operation is the high-speed scroll operation, the display control unit displays the plurality of information to correspond to a corrected stop position, to which the stop position determined by the determination unit is corrected.

A display control method of an electronic device of an embodiment is disclosed. The electronic device has display unit includes a display area and a storage unit that stores a plurality of information. The display control method of an embodiment includes: a first display step of displaying the plurality of information in the display area; a receiving step of receiving a scroll operation; a first determination step of determining whether the received scroll operation is a high-speed scroll operation of which a speed is higher than a predetermined speed; a second determination step of determining a stop position based on a scroll start position and a scroll operation speed; a second display step of displaying the plurality of information to correspond to the stop position determined in the second determination step when it is determined in the first determination step that the scroll operation is not the high-speed scroll operation; and a third display step of displaying the plurality of information to correspond to a corrected stop position, to which the stop position determined in the second determination step is corrected when it is determined in the first determination step that the scroll operation is the high-speed scroll operation.

BRIEF DESCRIPTION OF THE DRAWINGS

FIGS. 1A and 1B are diagrams illustrating an appearance of an electronic device.

FIG. 2 is a diagram illustrating an example of a screen which is displayed by the electronic device.

DETAILED DESCRIPTION

Figure 3:
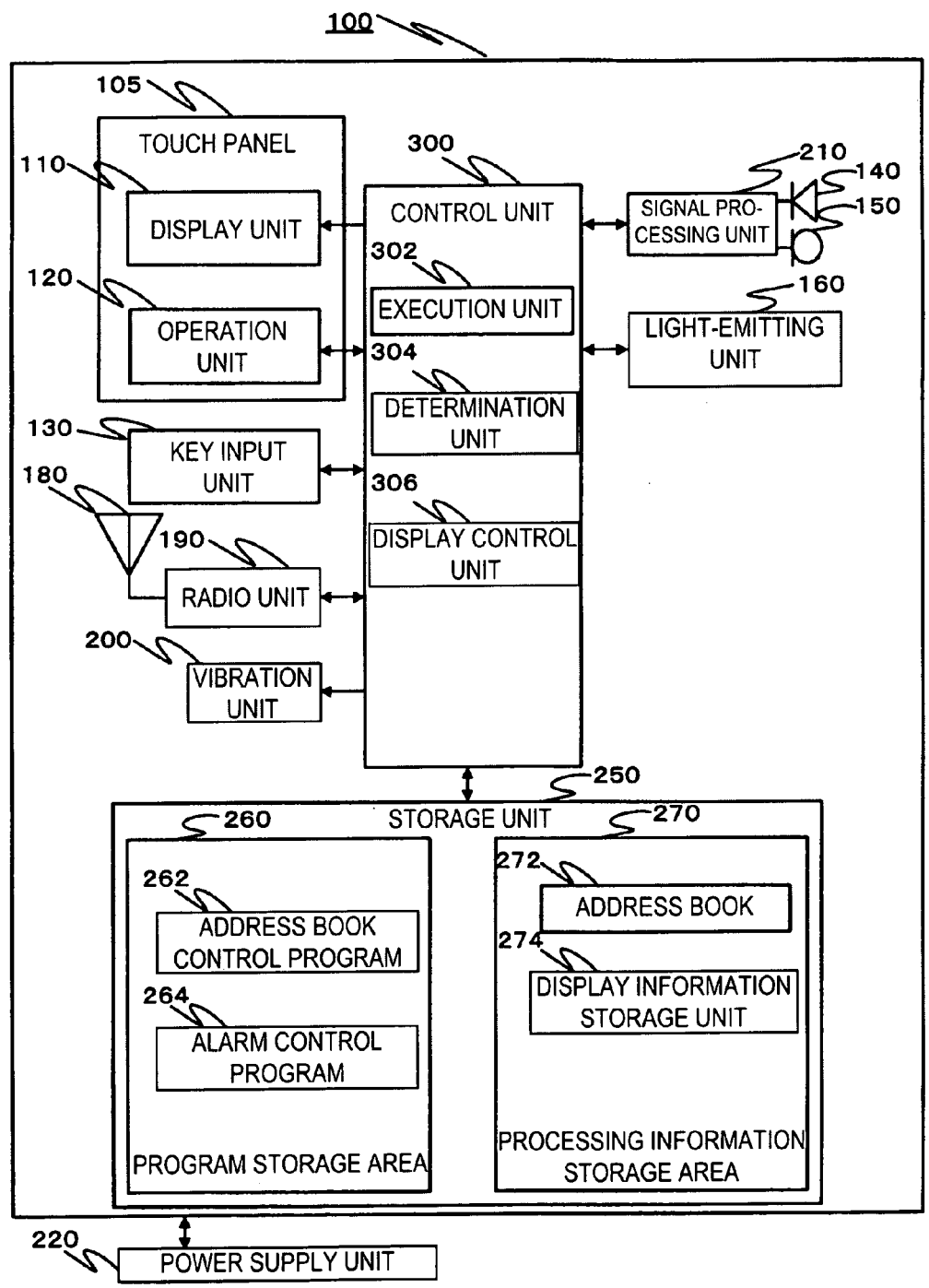
FIG. 3 is a block diagram illustrating an electrical configuration of the electronic device.

An electronic device according to an embodiment of the present disclosure will be described below in brief.

In the conventional technique, a user may have to repeatedly perform a scroll operation plural times to display desired information on the display.

Therefore, there may be demand for improvement in operability of a scroll operation.

In a potable terminal according to an practical example of the present disclosure, when plural information arranged based on a predetermined rule are displayed in a display area, a scroll stop position varies depending on a speed of a received scroll operation. Specifically, when the speed of the scroll operation is equal to or higher than a predetermined speed, a top information segmented by predetermined segment information among the plural information is displayed at an upper end of the display area. It is assumed that plural address information including information on at least phone numbers and names included in an address book are arranged and displayed in alphabetical order, based on the names included in the address information. The portable terminal receives a high-speed scroll operation when plural address information are displayed. When the high-speed scroll operation is received, information (segment information) including one letter of an alphabet is displayed in the upper end of the display area and address information segmented by the segment information, i.e. information including names beginning with the alphabetical letter included in the segment information, are displayed subsequently to the segment information.

When a plurality of address information stored in the address book are arranged and displayed in the alphabetical order based on the names included in the address information, a user performs an operation of updating display to display desired address information in the display area, that is, a scroll operation of scrolling the display. At this time, when a lot of information are stored and are arranged in the alphabetical order, the user has to perform the scroll operation plural times for displaying the address information including names beginning with a later letter (such as X or Z) in the alphabet. When the scroll operation is sequentially performed plural times, the display speed of the scroll is high and thus the user cannot confirm the display of desired information and excessively the scroll operation, so that the user has to perform an extra scroll operation to return the display to the position at which the desired information is displayed.

In the electronic device according to the aspect of the present disclosure, when the display control unit displays a plurality of information and a segment in the display area based on a predetermined rule and it is determined that the scroll operation is the high-speed scroll operation, the display control unit may display information indicating the segment to correspond to the corrected stop position. In the electronic device according to the aspect of the present disclosure, the plurality of information may be address information including at least name, and the segment may be a segment for each alphabetical letter.

In the electronic device according to the aspect of the present disclosure, segment information indicating the segment and the address information segmented by the segment may be displayed to be arranged in the display area.

When it is determined that the scroll operation is the high-speed scroll operation, the information serving as a segmentation point among the plurality of information may be displayed at the corrected stop position.

In the electronic device according to the embodiment of the present disclosure, when a high-speed scroll operation is received, segment information segmenting the address information is displayed at the upper end of the display area. Accordingly, when it is intended to display address information desired by the user, the user performs the high-speed scroll operation until the segment information segmenting the desired address information is displayed. When the segment information segmenting a desired name is displayed, the user performs a low-speed scroll operation to display the address information including the desired name. Therefore, it is possible to easily display desired address information without performing an unnecessary scroll operation.

According to the aspects of the present disclosure, it is possible to provide a technique capable of improving operability of a scroll operation.

Effects or meanings of the present disclosure will be apparent from the following description of embodiments. The embodiments are only practical examples for carrying out the present disclosure and the present disclosure is not limited to the following description of the embodiments.

Practical Example 1

Hereinafter, an aspect of the portable terminal according to the present disclosure will be described in detail with reference to FIGS. 1 to 7.

First, the configuration of the portable terminal 100 according to an embodiment of the present disclosure will be described with reference to FIGS. 1 to 3.

FIG. 1 is a diagram illustrating an appearance of a portable terminal 100, where FIG. 1A is a front view of the portable terminal 100 and FIG. 1B is a rear view of the portable terminal 100. The portable terminal 100 illustrated in FIG. 1A includes a touch panel 105, a key input unit 130, a sound output unit 140, a sound input unit 150, and a light-emitting unit 160.

The touch panel 105 includes a display unit 110 and an operation unit 120. The touch panel may be a capacitance type touch panel and may determine whether an operation (hereinafter, referred to as a touch operation) is performed based on a variation in capacitance occurring between a touch target such as a finger or a touch pen and an electrode located at a position corresponding to a display area 115.

The display unit 110 may be a backlight type liquid crystal display performing color display and includes a liquid crystal panel and a backlight irradiating the liquid crystal panel with light. The display unit 110 displays a variety of information such as display objects likes icons or widgets and images based on a control signal input from a control unit 230. The display unit 110 is not limited to the liquid crystal display but may be, for example, an organic EL display or a display in which plural LEDs are arranged in a matrix shape. In the following description, it is assumed for the purpose of convenience of explanation that the display unit 110 is a backlight type liquid crystal display and an area in which information is displayed on the liquid crystal display is defined as a display area 115.

The operation unit 120 includes an electrode that is disposed at a position corresponding to the display area 115 so as to detect a touch operation. The operation unit 120 can receive a touch operation and can output an input signal based on the received touch operation to the control unit 230.

The operation unit 120 can detect the operation position at which the touch operation is received and can output coordinate data of the detected operation position to the control unit 230. That is, a user inputs an operation position, an operation direction, or the like to the portable terminal 100 by performing a touch operation on the operation unit 120 with a touch target such as a finger or a touch pen.

The operation unit 120 can receive various touch operations. Examples of the touch operations include a tap operation and a scroll operation. The tap operation is an operation of touching the operation unit 120 with the touch target and then detaching the touch target from the operation unit 120 within a short period of time. The scroll operation is an operation of touching the operation unit 120 with the touch target, moving the touch target in a direction at a predetermined speed or higher in the touched state, and detaching the touch target from the operation unit 120. That is, the scroll operation is a touch operation including movement of a touched position.

The touch operation will be described in more detail. For example, when a touch becomes not detectable within a predetermined first time after an input to a touch position of the operation unit 120 is detected, that is, when an operation of detaching the touch target from the operation unit 120 is performed, the control unit 230 determines that a tap operation is performed. When an input to a touch position of the operation unit 120 is detected, the touch position moves within a predetermined second time, and then an input of a touch position is not to be received, the control unit 230 determines that a scroll operation is performed. This scroll operation is also referred to as a flick operation. The operation unit 120 may be configured to determine that a scroll operation is performed even when a touch position is not detected.

Now, the scroll operation will be described in more detail. When a scroll operation is received by the operation unit 120, information displayed in the display area 115 is scrolled. At this time, a scroll display speed and an scroll amount are determined based on the speed of the scroll operation and a scroll stop position is determined based on the scroll amount. The scroll display speed is a speed, a screen of the display while scrolling is changed at which. The user can determine the speed of the operation performed by himself or herself by checking the scroll display speed.

The scroll amount is a moving distance by which information displayed in the display area 115 is actually moved. For example, in a case where address information is displayed in the display area 115, the scroll amount is the number of address information where the display is moved (shifted), that is, the number of address information to be scrolled.

The scroll stop position is a position at which the scroll is stopped, and the position is determined based on a scroll start position and the scroll amount. Information displayed in the display area 115 is determined based on the scroll stop position.

The speed of the scroll operation is determined based on the distance of the touch position moving within the second time. Specifically, a long distance corresponds to a fast scroll operation and a short distance corresponds to a slow scroll operation. The speed of the scroll operation may be determined based on the time required for movement of a predetermined distance.

The touch operation will be described below in more detail with reference to FIG. 2. FIG. 2 illustrates an example of a screen (hereinafter referred to as a main screen) displayed on the display unit 110. When main touch keys 122 in FIG. 2 are touched, various processes are performed. For example, when a tap operation is performed on a menu key 122(a), a menu screen is displayed to overlap the screen. The menu screen includes, for example, a button for displaying an address book and a button for executing alarm setting. When a tap operation is performed on a home key 122(b) during an application is being executed, an application execution screen displayed on the display unit 110 is terminated, and then a main screen illustrated in FIG. 2 is displayed on the display unit 110. When a tap operation is performed on a return key 122(c), a screen displayed on the display unit 110 immediately before the current display on the display unit 110 is displayed. The main screen includes icons for executing predetermined applications. An address book icon 124 for displaying an address book and an alarm setting icon 126 for setting an alarm are arranged on the screen illustrated in FIG. 2.

The touch panel 105 may employ another type touch panel such as a resistive membrane type, an infrared type, or an electromagnetic induction type.

The touch operations are described above, but an operation of not directly touching the operation unit 120 with the touch target may be employed. Specifically, when a voltage of a predetermined value or more is applied to an electrode constituting the operation unit 120 disposed on the surface of the display area 115, detection sensitivity of the touch operation increases. When the detection sensitivity of the operation unit 120 increases, a variation in capacitance in a space separated from the electrode by several mm can be detected. That is, a non-contact operation based on the variation in capacitance can be detected. In this practical example, it is assumed that the touch operation includes the non-contact operation.

The key input unit 130 includes a hard key and can receive an input to the hard key. The input received by the key input unit 130 can be output as an input signal to the control unit 230. An input for adjustment of a sound volume or ON-OFF switching of a power supply may be assigned to the key input unit 130.

The sound output unit 140 includes a speaker or the like and has a function of outputting sound to the outside based on an analog signal output from the signal processing unit 210.

The sound input unit 150 includes a microphone or the like and has a function of converting sound from the outside such as voice into an analog signal and outputting the analog signal to the signal processing unit 210.

The light-emitting unit 160 includes a light-emitting device such as an LED. The light-emitting unit 160 can emit light to the outside in response to a control signal output from the control unit 230. The light-emitting unit 160 can inform the outside of an incoming call, reception of an E-mail, an alarm time, and the like by emitting light to the outside.

FIG. 3 is a block diagram illustrating the configuration of the mobile terminal 100. The mobile terminal 100 illustrated in FIG. 3 includes a touch panel 105, a display unit 110, an operation unit 120, a key input unit 130, a sound output unit 140, a sound input unit 150, a light-emitting unit 160, an antenna unit 180, a radio unit 190, a vibration unit 200, a signal processing unit 210, a control unit 230, a storage unit 250, and a power supply unit 220.

The configuration illustrated in FIG. 3 will be described below. Elements common to the elements illustrated in FIG. 1 will not be repeatedly described.

The antenna unit 180 can receive a radio wave of a predetermined frequency and can output a high-frequency signal to the radio unit 190. The antenna unit can output a high-frequency signal output from the radio unit 190 as a radio wave of a predetermined frequency to a base station.

The radio unit 190 can perform radio communication with another portable terminal or the base station. The radio unit 190 can perform a demodulation process and a decoding process on a predetermined high-frequency signal input from the antenna unit 180 to convert the high-frequency signal into a digital sound signal. The radio unit 190 can perform an encoding process and a modulation process on a digital sound signal input from the control unit 230 to convert the digital sound signal into a high-frequency signal and outputs the high-frequency signal to the antenna unit 180. The portable terminal 100 according to this embodiment has a mail function and can receive and transmit an E-mail to and from another electronic device via the radio unit 190.

The vibration unit 200 includes a motor and can generate mechanical vibration in response to a control signal output from the control unit 230. The vibration unit 200 can give an alarm of an incoming call, reception of an E-mail, an alarm time, and the like by the mechanical vibration.

The signal processing unit 210 can convert a digital signal output from the control unit 230 into an analog signal and can output the converted analog signal to the sound output unit 140. The signal processing unit 210 can convert an analog signal input from the sound input unit 150 into a digital signal and can output the digital signal to the control unit 230.

The power supply unit 220 includes a rechargeable battery such as a lithium ion battery. The power supply unit 220 can supply power to the elements of the portable terminal 100.

The control unit 230 includes at least one of a CPU and a DSP. The control unit 230 can perform various functions by controlling the elements of the portable terminal 100 under the control of a Linux (registered trademark)-based OS such as Android (registered trademark) and REX or other OSs. For example, the control unit 230 performs an alarm setting function, a mail transmitting and receiving function, a call function, and the like based on an input received by the key input unit 130 or the operation unit 120. The control unit 230 can execute a program stored in the storage unit 250.

The storage unit 250 includes a read only memory (ROM) and a random access memory (RAM). The storage unit 250 can store programs which are executed in the portable terminal 100, display information which is displayed on the display unit 110, and the like. The characteristic configuration of the storage unit 250 will be described below.

The storage unit 250 includes a program storage area 260 and a processing information storage area 270. The programs which are executed in the portable terminal 100 are stored in the program storage area 260. A variety of information (to be described below) which are processed when the programs are executed are stored in the processing information storage area 270. Thereafter, when the program storage area 260 and the processing information storage area 270 are not distinguished, both are together referred to as a "storage unit 250". The program storage area 260 stores, for example, a program for voice communication and a mail program for transmitting and receiving an E-mail. The program storage area 260 can store an address book control program 262 and an alarm setting control program 264 to be described later as characteristic programs of this practical example.

The processing information storage area 270 includes an address book 272 and a display information storage unit 274.

Plural address information input by a user's operation are stored in the address book 272. The address information includes identification information such as names or nicknames, indicating user names of other terminals, contact information such as phone numbers or mail addresses set for the terminals, memory numbers indicating numbers in which the address information are registered, and group information indicating groups of the address book.

When address information are displayed on the display area 115, the address information are arranged and displayed based on the identification information or the group information. The information arranged based on the arrangement rule are displayed for each segment. For example, when the address information are arranged based on the identification information, the address information are arranged in alphabetical order based on the names or nicknames included in the identification information. In this case, the segments are alphabets (A, B, C, . . . ) appearing in the heads of the names or nicknames. That is, when the address information are arranged based on the identification information, the address information are segmented and arranged by alphabets. Similarly, when the address information are arranged based on the group information, the address information are segmented for each group including the address information.

The display information storage unit 274 stores information to be displayed in the display area 115 when programs stored in the program storage area 260 are executed by the control unit 230. Specifically, screen information (FIGS. 4, 5, and 6), which is displayed in the display area 115 when the address book control program 262 is executed, and screen information (FIGS. 8, 9, and 10), which is displayed in the display area 115 when the alarm setting control program 264 is executed, are stored therein.

Figure 4:
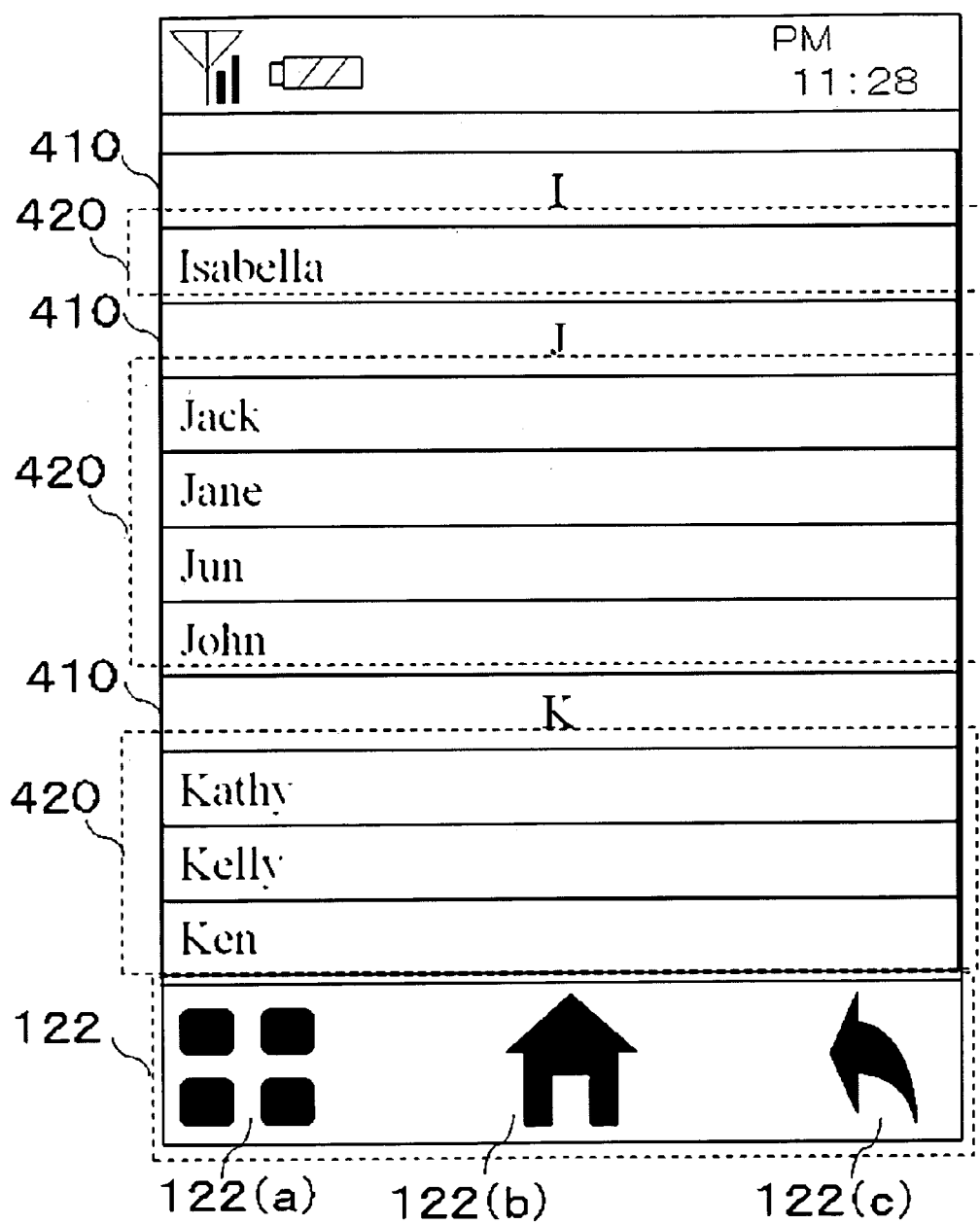
FIG. 4 is a diagram illustrating an example of a screen which is displayed by the electronic device.

FIG. 4 is a diagram illustrating a state where the address book control program 262 is executed by the control unit 230 and the address information 420 stored in the address book 272 are displayed in the display area 115. In FIG. 4, the address information 420 are displayed in the alphabetical order, and the segment information 410 including one alphabetical letter is displayed between the address information 420.

Figure 5:
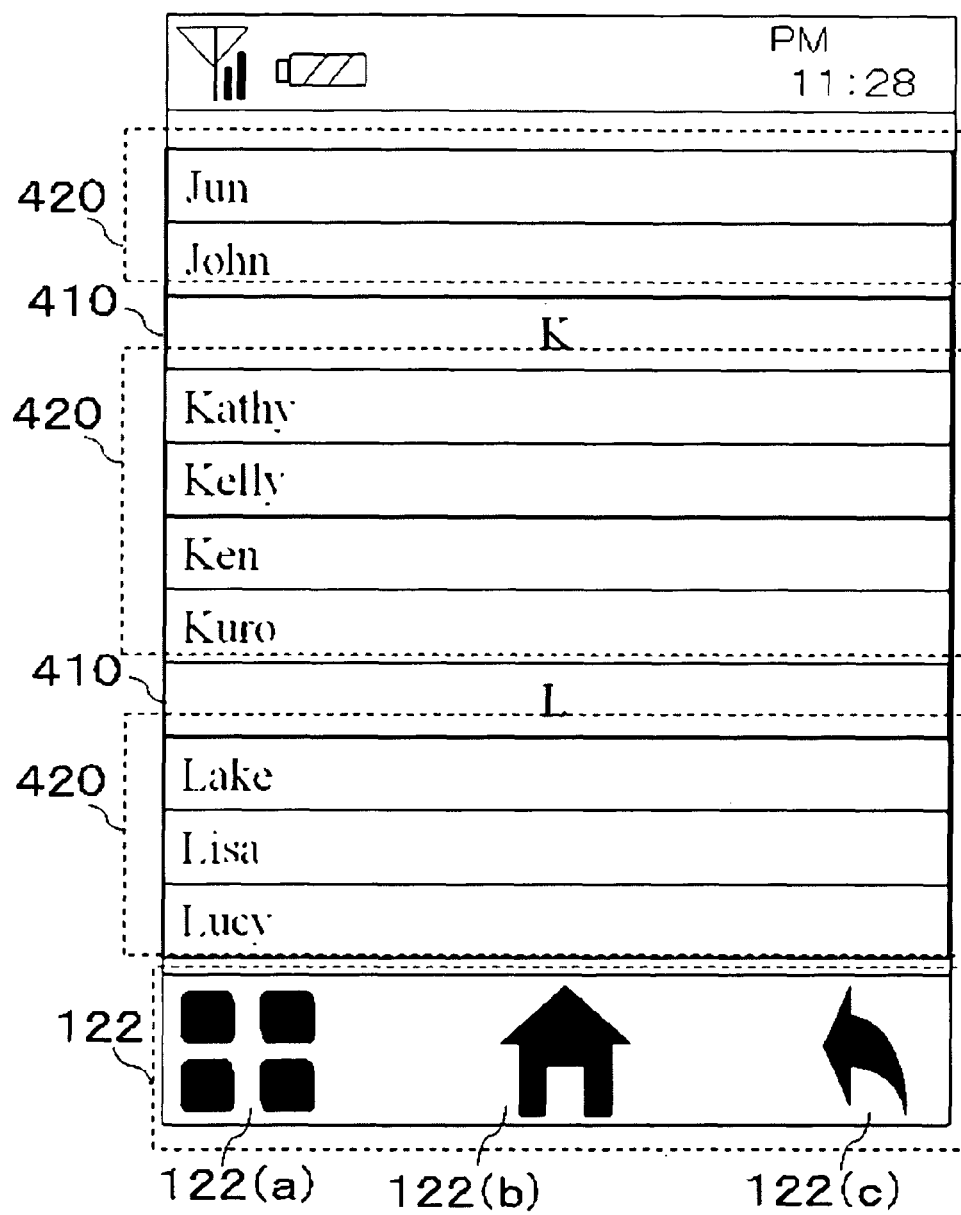
FIG. 5 is a diagram illustrating an example of a screen which is displayed by the electronic device.
Figure 6:
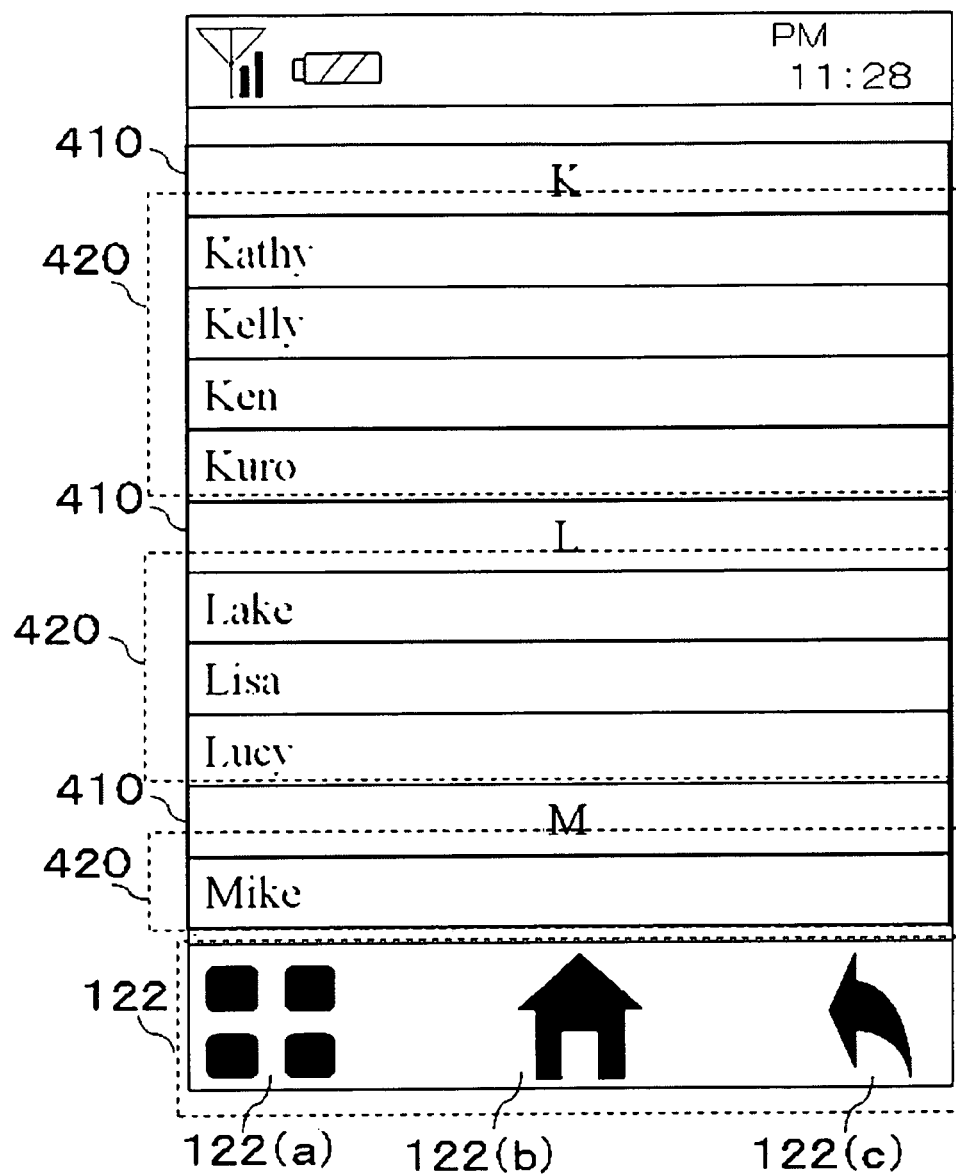
FIG. 6 is a diagram illustrating an example of a screen which is displayed by the electronic device.

FIGS. 5 and 6 are diagrams illustrating a state where a scroll operation is performed on the display area 115, the display is scrolled, and then the scroll of the display is stopped.

The operation unit 120 is configured to receive a low-speed scroll operation and a high-speed scroll operation as the scroll operation. The low-speed scroll operation is a scroll operation of which the speed is equal to or lower than a predetermined speed, and the high-speed scroll operation is a scroll operation of which the speed is higher than the predetermined speed. The predetermined speed may be set based on the speed of a general scroll operation or may be set to determine the scroll operation (high-speed scroll operation) which is faster than a general scroll operation (low-speed scroll operation).

FIG. 5 is a diagram illustrating a state where a stop position is determined based on the speed of a scroll operation, the scroll is stopped, and then information is displayed in the display area 115 when a low-speed scroll operation is received by the operation unit 120. FIG. 5 illustrates a state where the low-speed scroll operation is received and the address information including name Jun is displayed at the upper end of the display area 115. In this practical example, the scroll stop position which is determined based on the speed of the scroll operation is defined as a first position. When the low-speed scroll operation is performed, the first position is determined and any of the segment information 410 and the address information 420 corresponding to the first position is displayed in the display area 115. In FIG. 5, the first position is a position, at which the address information 420 including Jun is displayed at the upper end of the display area 115.

When a high-speed scroll operation is received by the operation unit 120, a second position at which the scroll is stopped is determined based on the scroll start position and the first position. That is, the segment information 410 is set to be displayed at the second position and the segment information 410 is displayed at the upper end of the display area 115. When the high-speed scroll operation is received, the segment information 410 is displayed at the upper end of the display area 115 based on the second position and the address information 420 related to the segment information is displayed below the segment information 410 (FIG. 6).

That is, the scroll stop position (first position) is determined based on the speed of the scroll operation received by the operation unit 120 and the segment information 410 farthest from the scroll start position among the segment information 410 included between the scroll start position and the first position is displayed at the upper end of the display area 115. In other words, the segment information 410 closest to the first position among the segment information 410 included between the scroll start position and the first position is displayed at the upper end of the display area 115.

More specific description will be made below. FIG. 6 illustrates a state where a high-speed scroll operation is received in the state illustrated in FIG. 4 and the scroll display is stopped. K of the segment information 410 is displayed at the upper end of the display area 115 and Kathy, Kelly, Ken, and Kuro are arranged and displayed as the address information 420 segmented by the segment K. Here, the address information positioned at the head of the segment information K is Kathy. The stop position (first position) determined based on the speed of the scroll operation is a position at which the address information 420 including Ken is displayed at the upper end of the display area 115. However, since the operation received by the operation unit 120 is a high-speed scroll operation, the scroll display is stopped at the position (second position) at which K which is the segment information 410 including the address information 420 including Ken is displayed at the upper end of the display area 115 as illustrated in FIG. 6. That is, when the received scroll operation is a high-speed scroll operation, the position (first position) at which the scroll is originally stopped by the scroll operation is corrected based on the start position of the high-speed scroll operation and the first position, and any of the segment information 410 is displayed at the upper end of the display area 115.

In the portable terminal 100 according to this practical example, when the high-speed scroll operation is received, the address information segmented by desired segment information are displayed subsequently to the segment information. Accordingly, a user can easily find out desired address information.

A configuration for causing the control unit 230 to execute the programs stored in the program storage area 260 will be described below.

Figure 7:
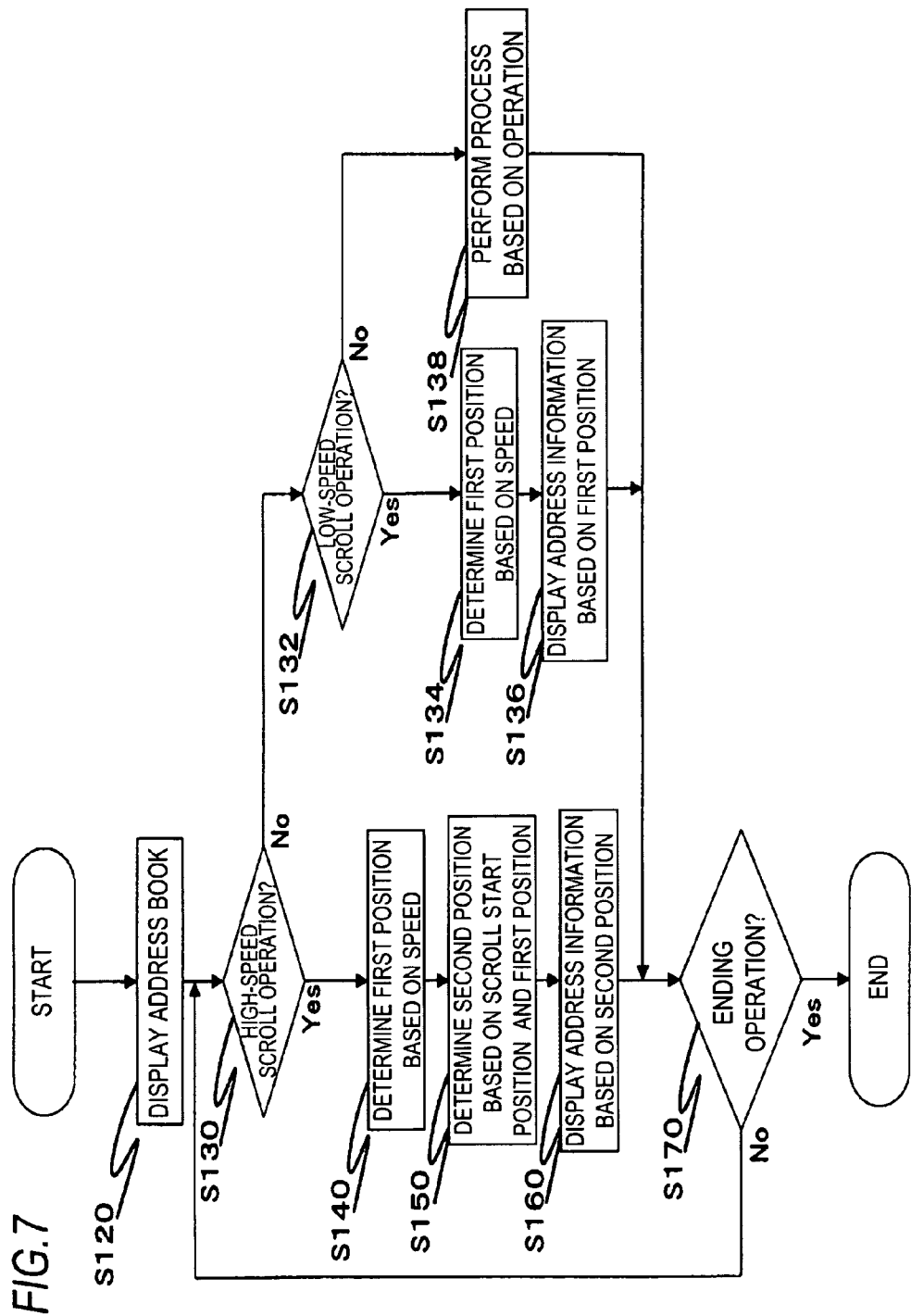
FIG. 7 is a flowchart illustrating an address book control program 262 which is executed by the electronic device.

An execution unit 302 can execute various programs stored in the storage unit 250. Specifically, the execution unit 302 can execute the address book control program 262 of which the flowchart is illustrated in FIG. 7 or the alarm control program 264 to be described later.

The determination unit 304 can determine the type of an input signal input to the control unit 230. The input signal received by the control unit 230 includes, for example, an input signal based on the operation received by the operation unit 120. The determination unit 304 can determine whether the operation received by the operation unit 120 is an operation of displaying the address information 420 included in the address book 272 in the display area 115, a scroll operation, or a high-speed scroll operation.

A display control unit 306 can display information stored in the storage unit 250 in the display area 115 based on the program executed by the execution unit 302. For example, the display control unit 306 displays the screens illustrated in FIG. 2 and FIGS. 4 to 6 in the display area 115.

The address book control program 262 which is executed by the execution unit 302 will be described below with reference to the flowchart illustrated in FIG. 7.

When a tap operation on the address book icon 124 is received in a state where the main screen illustrated in FIG. 2 is displayed in the display area 115, the address book control program 262 is executed by the execution unit 302.

When the address book control program 262 is executed, the display control unit 306 displays information on the address book 272 in the display area 115 as illustrated in FIG. 4 (S120).

Then, the determination unit 304 determines whether a high-speed scroll operation is received by the operation unit 120.

When the determination unit 304 determines that a high-speed scroll operation is received by the operation unit 120 (YES in S130), the determination unit determines the stop position (first position) of the scroll display based on the scroll start position and the speed of the scroll operation (S140).

Then, the determination unit 304 determines the second position based on the segment information related to the first stop position (S150).

Then, the display control unit 306 displays the segment information 410 determined based on the second position and the address information 420 segmented by the determined segment information 410 in the display area 115 (S160).

Subsequently, the determination unit 304 determines whether an operation of ending the display of the information on the address book 272 is received by the operation unit 120 (S170).

When the determination unit 304 determines that the operation of ending the display of the information on the address book 272 is received (YES in S170), the display control unit 306 ends the display of the address book 272. On the other hand, when it is determined that the operation is not received, the execution unit 302 performs the process of S130 again (NO in S170).

The process of S130 will be described again. When the determination unit 304 determines that a high-speed scroll operation is not received by the operation unit 120 (NO in S130), the determination unit 304 determines whether a low-speed scroll operation is received (S132). On the other hand, when the determination unit 304 determines that a low-speed scroll operation is not received by the operation unit 120 (No in S132), the execution unit 302 performs a process based on the operation received by the operation unit 120 (S138).

When the determination unit 304 determines that a low-speed scroll operation is received (YES in S132), the determination unit 304 determines the first position based on the speed of the scroll operation (S134).

Then, the display control unit 306 displays the address information 420 in the display area 115 based on the first position (S136).

According to the above-mentioned processes, when a high-speed scroll operation is received by the operation unit 120, the segment information 410 set at the second position determined based on the scroll start position and the first position is displayed at the upper end of the display area 115. Accordingly, a user can easily find out the desired address information.

Practical Example 2

Alarm setting performed by the portable terminal 100 will be described below as another practical example. Description for the same elements as in Practical example 1 will be omitted.

When the main screen illustrated in FIG. 2 is displayed in the display area 115 and an operation on the alarm setting icon 126 is received by the operation unit 120, the alarm setting control program 350 is executed.

Figure 8:
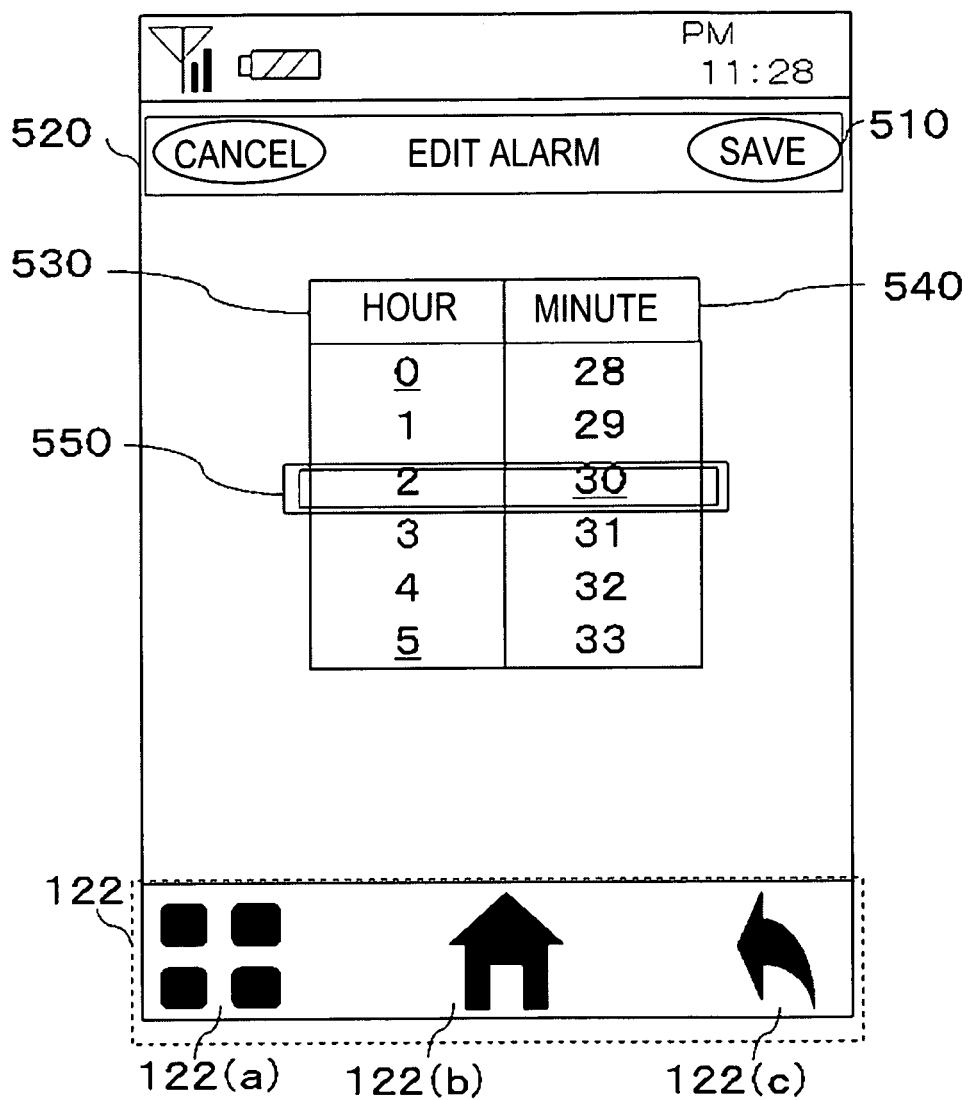
FIG. 8 is a diagram illustrating an example of a screen which is displayed by the electronic device.

FIG. 8 is a diagram illustrating an alarm setting screen, which is displayed in the display area 115 when the alarm setting control program 350 is executed. The alarm setting screen is stored in the display information storage unit 274. The alarm setting screen includes a save button 510 for storing setting of an alarm time in the storage unit 250, a cancel button 520 for cancelling the setting of an alarm, an hour unit setting area 530 for setting any hour-unit numeral of 00 (12 o'clock or 24 o'clock) to 23, a minute unit setting area 550 for setting any minute-unit numeral of 00 to 59, and a setting area 550 for displaying the set time.

When an operation (for example, a tap operation) on the save button 510 is received by the operation unit 120, the time displayed in the setting area 550 at the operation time is stored as an alarm time in the storage unit 250.

On the other hand, when an operation (for example, a tap operation) on the cancel button 520 is received by the operation unit 120, the alarm setting is ended.

For example, when an upward or downward scroll operation is received in the hour unit setting area 530 in the screen illustrated in FIG. 8, the display is scrolled and any numeral of 00 to 23 is displayed in the setting area 550. On the other hand, when an upward or downward scroll operation is received in the minute unit setting area 540, the display is scrolled and any numeral of 00 to 59 is displayed in the setting area 550.

Figure 9:
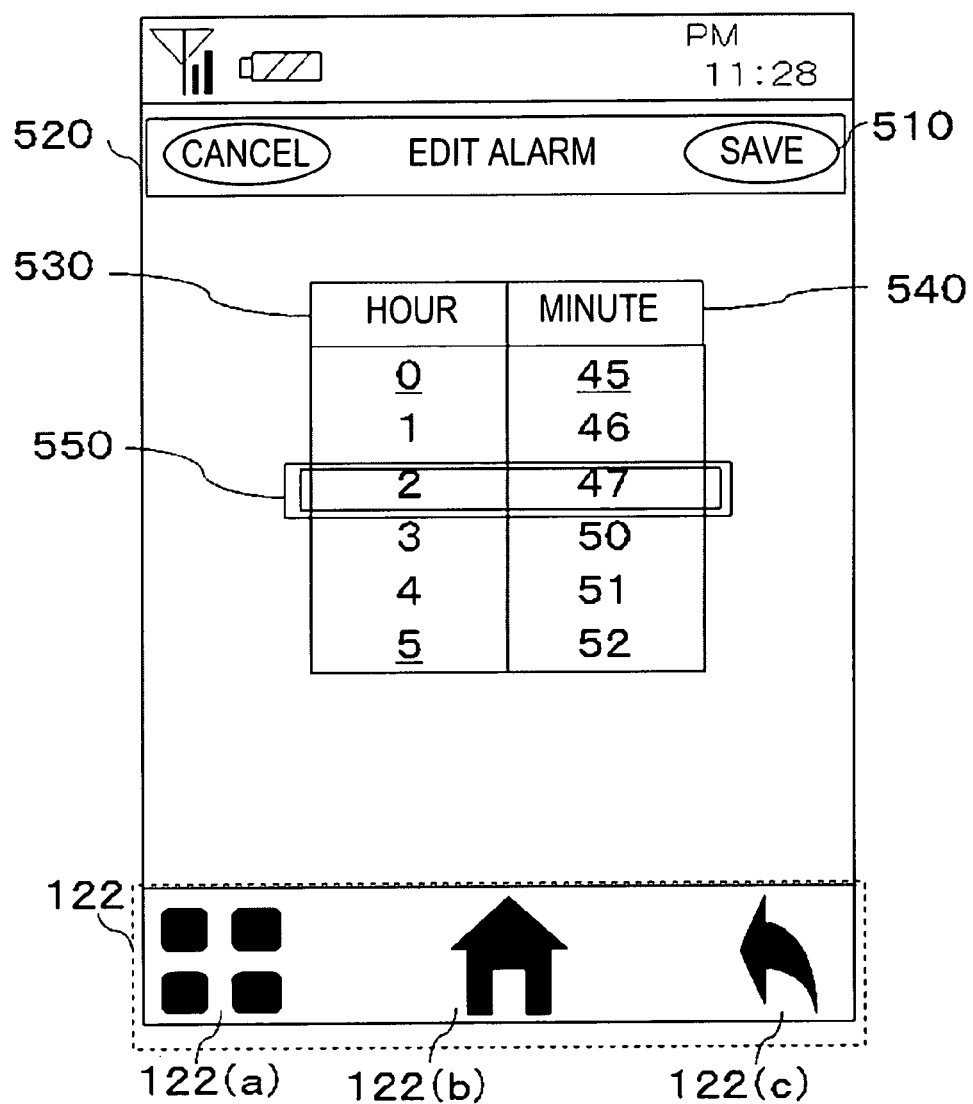
FIG. 9 is a diagram illustrating an example of a screen which is displayed by the electronic device.

FIG. 9 is a diagram illustrating a screen in which the scroll is stopped at the stop position determined based on the scroll operation when a low-speed scroll operation on the minute unit setting area 540 is received by the operation unit 120. When a low-speed scroll operation is received by the operation unit 120, any numeral of 00 to 59 set in the minute unit setting area 540 is set in the setting area 550.

Figure 10:
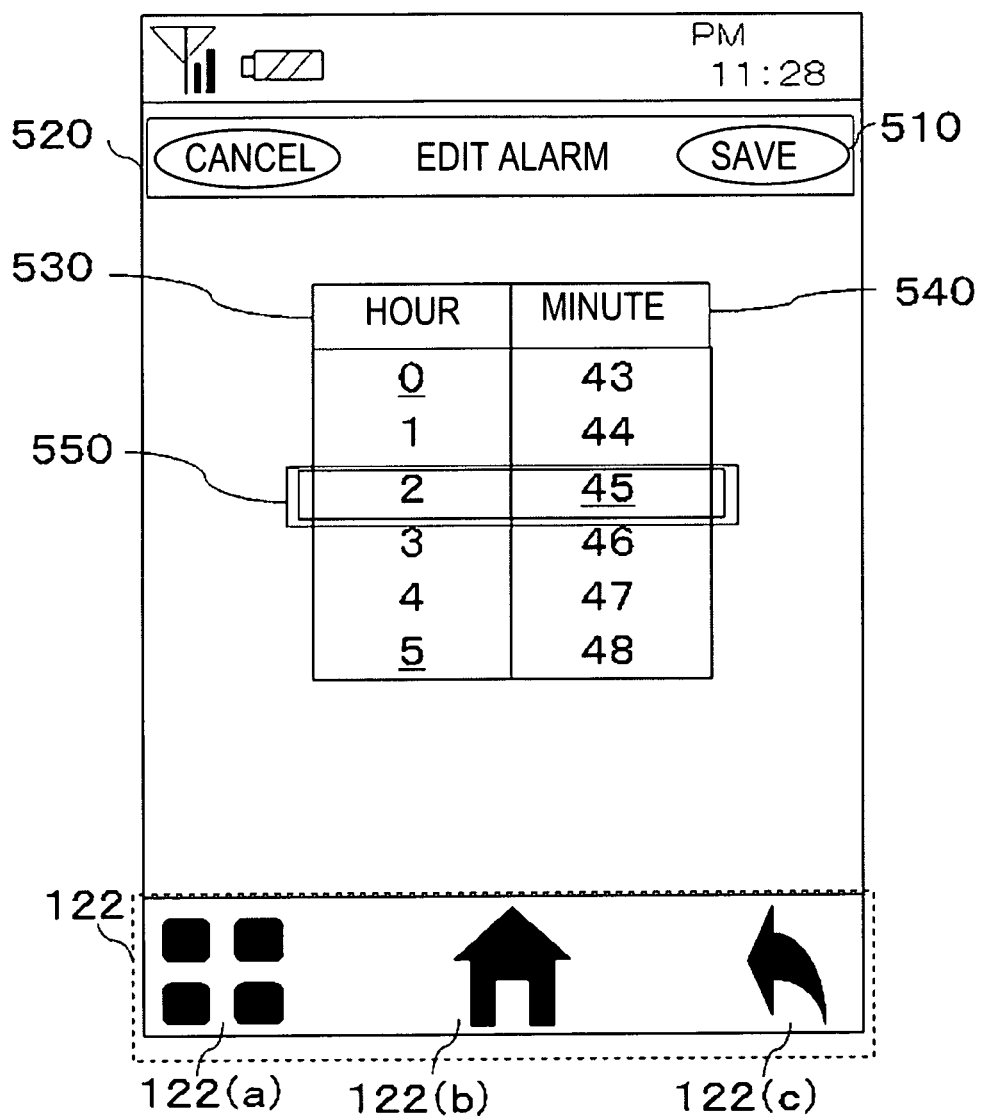
FIG. 10 is a diagram illustrating an example of a screen which is displayed by the electronic device.

FIG. 10 is a diagram illustrating a screen in which the scroll is stopped at the stop position determined based on the scroll start position and the scroll operation when a high-speed scroll operation on the minute unit setting area 540 is received by the operation unit 120. When a high-speed scroll operation is received, any multiple of five among 00 to 59 is set in the setting area 550.

In setting the minute unit in the alarm setting, for example, a minute-unit time which can be easily segmented such as multiples of five is often set. In the above-mentioned aspect, when a high-speed scroll operation is performed, a numeral which can be easily segmented (segment numeral) and which is arranged at a position included between the scroll start position and the stop position determined based on the speed of the scroll operation and located farthest from the scroll start position is displayed in the setting area 550. According to this aspect, a user can easily set an alarm time.

An operation in the minute unit setting area 540 has been exemplified above, but the same process is performed on an operation in the hour unit setting area 530. Specifically, when a high-speed scroll operation is received, a segment numeral, that is, multiples of two from 00 to 23, is displayed in the setting area 550. The segment information is not limited to the segment numeral such as multiples of two, but may be set to a segment numeral such as multiples of five or multiples of ten.

The above-mentioned processes may be applied to both the minute unit setting area 540 and the hour unit setting area 530, or may be applied to only one thereof.

The configuration of the control unit 300 for executing the alarm control program 264 will be described below with reference to FIG. 3.

Figure 11:
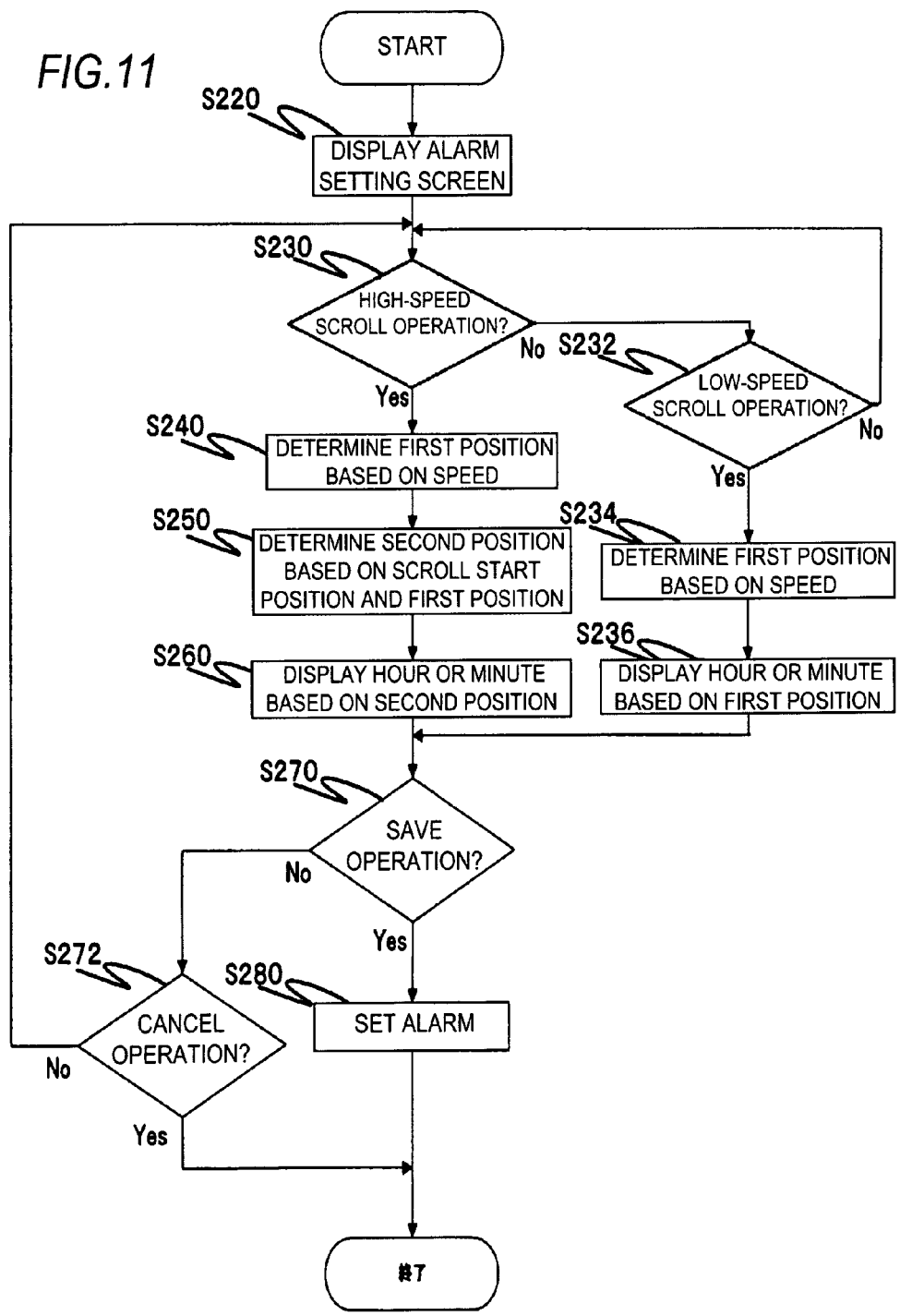
FIG. 11 is a flowchart illustrating an alarm control program 264 which is executed by the electronic device.

The execution unit 302 executes the alarm control program 264 of which the flowchart is illustrated in FIG. 11.

The determination unit 304 determines whether a received operation is an operation of starting alarm setting, an operation of storing alarm setting, or an operation of cancelling alarm setting.

The display control unit 306 displays information stored in the storage unit 250 in the display area 115 based on the program which is executed by the execution unit 302. For example, the display control unit 306 displays the screens illustrated in FIGS. 8 to 10 in the display area 115.

The alarm control program 362 will be described below with reference to the flowchart illustrated in FIG. 11.

When a tap operation on the alarm setting icon 126 is received in a state where the main screen illustrated in FIG. 2 is displayed in the display area 115, the execution unit 302 executes the alarm control program 264.

When the alarm control program 264 is executed, the display control unit 306 displays the alarm setting screen in the display area 115 (S220).

Then, the determination unit 304 determines whether the operation unit 120 receives a high-speed scroll operation on the hour unit setting area 530 or the minute unit setting area 540 (S230).

When the determination unit 304 determines that the operation unit 120 receives a high-speed scroll operation on the hour unit setting area 530 or the minute unit setting area 540 (YES in S230), the display control unit 306 scrolls the display in any of the hour unit setting area 530 and the minute unit setting area 540 on which the scroll operation is received. The stop position (first position) at which the scroll of the display is stopped based on the speed of the scroll operation (S240).

Then, the determination unit 304 determines the second position based on the scroll start position and the first position (S250).

Then, the display control unit 306 displays a segment numeral determined based on the second position in the setting area 550 illustrated in FIG. 8 (S260). Specifically, when it is determined in S230 that a high-speed scroll operation on the hour unit setting area 530 is received, the segment numeral is multiples of two among 00 to 23. On the other hand, when a high-speed scroll operation on the minute unit setting area 540 is received, the segment numeral is multiples of five among 00 to 59.

Then, the determination unit 304 determines whether a save operation is received by the operation unit 120 (S270). The save operation is a tap operation on the save button 510 illustrated in FIG. 8. When the determination unit 304 determines that the save operation is received by the operation unit 120 (YES in S270), the execution unit 302 stores the alarm setting based on the time, which is displayed in the setting area 550 at the time of the save operation, in the storage unit 250.

On the other hand, when the determination unit 304 determines that the save operation is not received by the operation unit 120 (NO in S270), the determination unit 304 determines whether a cancel operation is received by the operation unit 120 (S272). The cancel operation is a tap operation on the cancel button 520 illustrated in FIG. 8. When the determination unit 304 determines that the cancel operation is received, the execution unit 302 ends the alarm setting without storing the input alarm time (YES in S272).

The process of S230 will be described again. When the determination unit 304 determines that a high-speed scroll operation on the hour unit setting area 530 or the minute unit setting area 540 is not received by the operation unit 120 (YES in S230), the determination unit 304 determines whether a low-speed scroll operation is received (S232).

When the determination unit 304 determines that a low-speed scroll operation is received by the operation unit 120 (YES in S232), the determination unit 304 determines the first position based on the speed of the scroll operation (S234).

Then, the display control unit 306 displays numerals corresponding to the hour unit setting area 530 and the minute unit setting area 540 in the setting area 550 in the display area 115 based on the first position. Specifically, when it is determined in S230 that the high-speed scroll operation on the hour unit setting area 530 is received by the operation unit 120, the display control unit 306 displays a numeral among 00 to 23 in the setting area 550. On the other hand, when the scroll operation on the minute unit setting area 540 is received by the operation unit 120, the display control unit 306 displays a numeral among 00 to 59 in the setting area 550.

Other Practical Examples

Other practical examples will be described below.

The present disclosure is not limited to the straight type portable terminal 100 illustrated in FIG. 1, but may be applied to a folding type portable terminal or a slide type portable terminal having a touch panel 170.

The scroll operation of scrolling the display from up to down has been exemplified above. However, the present disclosure may be applied to a scroll operation of scrolling the display in the reverse direction, that is, from down to up.

When a high-speed scroll operation is received, the segment information 410 segmenting the address information may be displayed at the upper end of the display area 115 based on the name of the address information set at the first position which is determined based on the scroll operation.

In Practical example 1, the address information 410 are arranged and displayed in the alphabetical order. However, the present disclosure is not limited to the practical example in which the address information are arranged in the alphabetical order, but may be applied to a case in which the address information 420 which are arranged in the order of group names are displayed based on group information corresponding to the address information 410. In this case, group names are displayed in the segment information 410 and the address information segmented for each group name are arranged and displayed in the alphabetical order. The present disclosure may be applied to a case in which the address information 420 are arranged and displayed in the display area 115 based on memory numbers corresponding to the address information 420. In this case, the segment information 410 includes easily-segmented numerals (for example, multiples of ten or multiples of twenty) of the memory number and the address information 420 are arranged and displayed in the memory number order.

The programs described in this practical example may be stored in an HDD of a data distribution server and may be distributed to the portable terminal 100 via a network. Plural programs may be stored in an optical disc such as a CD, a DVD, or a Blue-ray (registered trademark) Disc (BD) or a storage medium such as a USB memory and a memory card and the storage medium may be sold or distributed. When the plural programs downloaded via the server, the storage medium or the like are installed in an electronic book terminal having the same configuration as in this practical example, the same advantages as in this practical example are obtained.

The present disclosure is not limited to the above-mentioned practical example but may be applied to a so-called smartphone, a personal digital assistant (PDA), a notebook PC, or the like.

What is claimed is:

1. An electronic device comprising:
   a display that includes a display area;
   a storage that stores a plurality of information;
   a human interface device that receives a scroll operation; and
   a controller configured to perform:
   controlling the display to display the plurality of information in the display area, wherein the plurality of information includes indicative information;
   determining whether the scroll operation received by the human interface device is a high-speed scroll operation, of which a speed is higher than a predetermined speed, and
   determining a stop position, based on a scroll start position and a scroll operation speed,
   wherein when it is determined that the scroll operation is not the high-speed scroll operation, the controller controls the display to display the plurality of information to correspond to the stop position, without correction, and
   wherein when it is determined that the scroll operation is the high-speed scroll operation and when the indicative information is not displayed at a predetermined position, the controller corrects the stop position to display the indicative information at the predetermined position and controls the display to display the plurality of information at the predetermined position, which corresponds to a corrected stop position.

2. The electronic device according to claim 1,
   wherein when the controller controls the display to display a plurality of information and a segment in the display area based on a predetermined rule and it is determined that the scroll operation is the high-speed scroll operation, the controller controls the display to display information indicating the segment to correspond to the corrected stop position.

3. The electronic device according to claim 2,
   wherein the plurality of information is address information including at least name, and the segment is a segment for each alphabetical letter.

4. The electronic device according to claim 3,
   wherein segment information indicating the segment and the address information segmented by the segment are displayed to be arranged in the display area.

5. The electronic device according to claim 1,
   wherein when it is determined that the scroll operation is the high-speed scroll operation, the information serving as a segmentation point among the plurality of information is displayed at the corrected stop position.

6. A display control method of an electronic device having a display includes a display area and a storage that stores a plurality of information, the display control method comprising:
   displaying the plurality of information in the display area, wherein the plurality of information includes indicative information;
   receiving a scroll operation;
   determining whether the received scroll operation is a high-speed scroll operation of which a speed is higher than a predetermined speed;
   determining a stop position based on a scroll start position and a scroll operation speed;
   displaying the plurality of information to correspond to the stop position without correction when it is determined that the scroll operation is not the high-speed scroll operation; and
   when it is determined that the scroll operation is the high-speed scroll operation and when the indicative information is not displayed at a predetermined position, correcting the stop position to display the indicative information at the predetermined position and controlling the display to display the plurality of information at the predetermined position corresponding to a corrected stop position.

* * * * *